United States Patent
Imanishi et al.

(10) Patent No.: US 6,174,257 B1
(45) Date of Patent: Jan. 16, 2001

(54) TOROIDAL TYPE CONTINUOUSLY VARIABLE TRANSMISSION

(75) Inventors: Takashi Imanishi; Nobuaki Mitamura, both of Yokohama; Nobuo Goto, Fujisawa; Makoto Fujinami, Chiba; Hiroshi Kato, Fujisawa, all of (JP)

(73) Assignee: NSK Ltd., Tokyo (JP)

( * ) Notice: Under 35 U.S.C. 154(b), the term of this patent shall be extended for 0 days.

(21) Appl. No.: 09/108,174

(22) Filed: Jul. 1, 1998

(30) Foreign Application Priority Data

Jul. 4, 1997 (JP) .................................................. 9-179945
Nov. 14, 1997 (JP) .................................................. 9-313464

(51) Int. Cl.⁷ .................................................. F16H 15/38
(52) U.S. Cl. .................................................. 476/40; 476/42
(58) Field of Search .................................. 476/67, 72, 73, 476/40, 42

(56) References Cited

U.S. PATENT DOCUMENTS

| 4,916,751 | 4/1990 | Sumita et al. | 384/516 |
| 5,556,348 | * 9/1996 | Kokubu et al. | 476/40 |
| 5,735,769 | * 4/1998 | Takemura et al. | 476/40 |
| 5,855,531 | * 1/1999 | Mitamura et al. | 476/46 |

FOREIGN PATENT DOCUMENTS

| 42 13 415 | 10/1992 | (DE) . |
| 42 16 430 | 12/1992 | (DE) . |
| 44 31 007 | 3/1995 | (DE) . |
| 0 780 599 | 6/1997 | (EP) . |
| 62-71465 | 5/1987 | (JP) . |
| 1-173552 | 12/1989 | (JP) . |
| 7-71555 | 3/1995 | (JP) . |
| 7-35847 | 7/1995 | (JP) . |
| 7-208569 | 8/1995 | (JP) . |
| 7-243494 | 9/1995 | (JP) . |
| 7-243495 | 9/1995 | (JP) . |
| 7-286649 | 10/1995 | (JP) . |
| 8-178007 | 7/1996 | (JP) . |

* cited by examiner

Primary Examiner—David Fenstermacher
(74) Attorney, Agent, or Firm—Vorys, Sater, Seymour and Pease LLP

(57) ABSTRACT

An outer race of a thrust ball bearing supporting a thrust load applied to a power roller is rotatably supported around a displacement shaft. A portion in which the contact pressure between an outer race track and the rolling surface of a rolling member is high changes so that the fatigue of the outer race track does not progress locally. Also, the power roller and the outer race are subjected to predetermined treatment and working. Irrespective of a great thrust load applied during operation, stress is alleviated and the lubricating property of the portion of contact is made good to thereby prevent cracks or early wear from occurring.

12 Claims, 8 Drawing Sheets

TOROIDAL TYPE CONTINUOUSLY VARIABLE TRANSMISSION

BACKGROUND OF THE INVENTION

1. Field of the Invention

This invention relates to a toroidal type continuously variable transmission for use, for example, as an automatic transmission for an automobile. More particularly, it relates to improvements in a power roller and a thrust bearing for supporting the power roller.

2. Related Background Art

It has been studied to use a toroidal type continuously variable transmission as schematically shown in FIGS. 8 and 9 of the accompanying drawings as a transmission for an automobile. This toroidal type continuously variable transmission, as disclosed, for example, in Japanese Laid-Open Utility Model Application No. 62-71465, has an input side disc 2 supported concentrically with an input shaft 1, and an output side disc 4 fixed to the end portion of an output shaft 3 disposed coaxially with the input shaft 1. Trunnions 6, 6 rockable about pivot shafts 5, 5 transverse to the input shaft 1 and the output shaft 3 are provided inside a casing containing the toroidal type continuously variable transmission therein.

The trunnions 6, 6 have the pivot shafts 5, 5 provided on the outer sides of the opposite end portions thereof. Also, the base end portions of displacement shafts 7, 7 are supported on the central portions of the trunnions 6, 6 and the trunnions 6, 6 are rocked about the pivot shafts 5, 5 to thereby make the angles of inclination of the displacement shafts 7, 7 adjustable. Power rollers 8, 8 are rotatably supported around the displacement shafts 7, 7 supported on the trunnions 6, 6. The power rollers 8, 8 are held between the input side and output side discs 2 and 4. The inner sides 2a and 4a of the input side and output side discs 2 and 4 which are opposed to each other have their cross-sections each forming a concave surface generated by rotating an arc centered on a pivot shaft 5 about the input shaft 1 or the output shaft 3. The peripheral surfaces 8a, 8a of the power rollers 8, 8 are formed into spherical convex surfaces and bear against the inner sides 2a and 4a.

A loading cam type pressing device 9 is provided between the input shaft 1 and the input side disc 2, and the input side disc 2 is resiliently pressed toward the output side disc 4 by this pressing device 9. The pressing device 9 is comprised of a cam plate 10 rotatable with the input shaft 1, and a plurality of (e.g. four) rollers 12, 12 held by a holder 11. A cam surface 13 which is an uneven surface in a circumferential direction is formed on one side (the left side as viewed in FIGS. 8 and 9) of the cam plate 10, and a similar cam surface 14 is formed on the outer side (the right side as viewed in FIGS. 8 and 9) of the input side disc 2. The plurality of rollers 12, 12 are supported for rotation about radial axes relative to the center of the input shaft 1.

When during the use of the toroidal type continuously variable transmission constructed as described above, the cam plate 10 rotates with the rotation of the input shaft 1, the cam surface 13 presses the plurality of rollers 12, 12 against the cam surface 14 on the outer side of the input side disc 2. As the result, the input side disc 2 is pressed against the power rollers 8, 8 and at the same time, the input side disc 2 is rotated on the basis of the pressing of the pair of cam surfaces 13, 14 against the plurality of rollers 12, 12. This rotation of the input side disc 2 is transmitted to the output side disc 4 through the power rollers 8, 8 to thereby rotate the output shaft 3 fixed to the output side disc 4.

When the rotational speed ratio (the transmission gear ratio) between the input shaft 1 and the output shaft 3 is to be changed and deceleration is first to be done between the input shaft 1 and the output shaft 3, the trunnions 6, 6 are rocked about the pivot shafts 5, 5 and the displacement shafts 7, 7 are inclined so that as shown in FIG. 8, the peripheral surfaces 8a, 8a of the power rollers 8, 8 may bear against the portion toward the center of the inner side 2a of the input side disc 2 and the portion toward the outer periphery of the inner side 4a of the output side disc 4, respectively. When conversely, acceleration is to be done, the displacement shafts 7, 7 are inclined so that as shown in FIG. 9, the peripheral surfaces 8a, 8a of the power rollers 8, 8 may bear against the portion toward the outer periphery of the inner side 2a of the input side disc 2 and the portion toward the center of the inner side 4a of the output side disc 4, respectively. If the angles of inclination of the displacement shafts 7, 7 are made medium between FIGS. 8 and 9, a medium transmission gear ratio will be obtained between the input shaft 1 and the output shaft 3.

Further, FIGS. 10 and 11 of the accompanying drawings show a toroidal type continuously variable transmission described in the microfilm of Japanese Utility Model Application No. 63-69293 (Japanese Laid-Open Utility Model Application No. 1-173552). An input side disc 2 and an output side disc 4 are rotatably supported around an input shaft 15 needle bearings 16 and 16, respectively. Also, a cam plate 10 is spline-engaged with the outer peripheral surface of an end portion (the left end portion as viewed in FIG. 10) of the input shaft 15, and is prevented from moving away from the input side disc 2 by a flange portion 17. The cam plate 10 and rollers 12, 12 together constitute a loading cam type pressing device 9 for rotating the input side disc 2 while pressing it toward the output side disc 4 on the basis of the rotation of the input shaft 15. An output gear 18 is coupled to the output side disc 4 by keys 19, 19 so that the output side disc 4 and the output gear 18 may rotate in synchronism with each other. The output gear 18 and a gear or the like, not shown, meshing with the output gear 18 together constitute a power output mechanism to output the rotation of the output disc.

Pivot shafts 5, 5 provided at the opposite end portions of a pair of trunnions 6, 6 are supported on a pair of yokes 20, 20 for rocking movement and displacement in an axial direction (the front to back direction as viewed in FIG. 10 or the left to right direction as viewed in FIG. 11). The pair of yokes 20, 20 are in the form of metallic plates having sufficient rigidity, and have circular holes formed in the central portions thereof fitted on support posts 24a, 24b secured to the inner surface of a casing 22 or the side of a cylinder case 23 provided in the casing 22, whereby they are supported for rocking movement and displacement in the axial direction of the pivot shafts 5, 5. Circular support holes 25, 25 are formed in the opposite end portions of the yokes 20, 20, and the pivot shafts 5, 5 are supported in the support holes 25, 25 by radial needle bearings 27, 27 provided with outer races 26, 26. On the basis of these constructions, the trunnions 6, 6 are supported in the casing 22 for rocking movement about the pivot shafts and displacement in the axial direction of the pivot shafts 5, 5.

Displacement shafts 7, 7 are supported in circular holes 52, 52 formed in the intermediate portions of the trunnions 6, 6 supported in the casing 22 in the manner described above. These displacement shafts 7, 7 have support shaft portions 28, 28 and pivot shaft portions 29, 29 parallel to each other and eccentric with respect to each other. The support shaft portions 28, 28 are rockably supported inside the circular holes 52, 52 through radial needle bearings 30, 30. Power rollers 8, 8 are rotatably supported around the pivot shaft portions 29, 29 through radial anti-friction bearings such as radial needle bearings 31, 31.

The pair of displacement shafts 7, 7 are provided at opposite positions of 180° about the input shaft 15. Also, the directions in which the pivot shaft portions 29, 29 of the displacement shafts 7, 7 are eccentric with respect to the support shaft portions 28, 28 are the same direction (the right to left direction as viewed in FIG. 11) with respect to the direction of rotation of the input side and output side disc 2 and 4. Also, the direction of eccentricity is a direction substantially orthogonal to the direction of disposition (the left to right direction as viewed in FIG. 10 or the front to back direction as viewed in FIG. 11) of the input shaft 15. Accordingly, the power rollers 8, 8 are supported for some displacement in the direction of disposition of the input shaft 15. As the result, even if due to the irregularity of the dimensional accuracy of any constituent part or the resilient deformation or the like during the transmission of power, the power rollers 8, 8 tend to be displaced in the axial direction (the left to right direction as viewed in FIG. 10 or the front to back direction as viewed in FIG. 11) of the input shaft 15, this displacement can be absorbed without any unreasonable force being applied to each constituent part.

Also, between the outer sides of the power rollers 8, 8 and the inner sides of the intermediate portions of the trunnions 6, 6, thrust anti-friction bearings such as thrust ball bearings 32, 32 and thrust bearings such as thrust needle bearings 34, 34 supporting a thrust load applied to outer races 33, 33 which will be described next are provided in succession from the outer sides of the power rollers 8, 8. The thrust ball bearings 32, 32 permit the rotation of the power rollers 8, 8 while supporting a load in a thrust direction applied to the power rollers 8, 8. Also, the thrust needle bearings 34, 34 permit the pivot shaft portions 29, 29 and the outer races 33, 33 to rock about the support shaft portions 28, 28 while supporting a thrust load applied from the power rollers 8, 8 to the outer races 33, 33 of the thrust ball bearings 32, 32.

Also, driving rods 35, 35 are coupled to one end portion (the left end portion as viewed in FIG. 11) of the trunnions 6, 6 and driving pistons 36, 36 are secured to the outer peripheral surfaces of the intermediate portions of the driving rods 35, 35. The driving pistons 36, 36 are oil-tightly fitted in driving cylinders 37, 37 provided in the cylinder case 23. Further, a pair of anti-friction bearings 39, 39 are provided between a support wall 38 provided in the casing 22 and the input shaft 15 to thereby rotatably support the input shaft 15 in the casing 22.

In the case of the toroidal type continuously variable transmission constructed as described above, the rotation of the input shaft 15 is transmitted to the input side disc 2 through the pressing device 9. The rotation of this input side disc 2 in turn is transmitted to the output side disc 4 through the pair of power rollers 8, 8 and further, the rotation of the output side disc 4 is output via the output gear 18. When the rotational speed ratio between the input shaft 15 and the output gear 18 is to be changed, the pair of driving pistons 36, 36 are displaced in opposite directions. With the displacement of the driving pistons 36, 36, the pair of trunnions 6, 6 are displaced in opposite directions, and for example, the lower power roller 8 in FIG. 11 is displaced to the right as viewed in FIG. 11 and the upper power roller 8 in FIG. 11 is displaced to the left as viewed in FIG. 11. As the result, the direction of a force in the tangential direction acting on the portions of contact between the peripheral surfaces 8a, 8a of the power rollers 8, 8 and the inner sides 2a and 4a of the input side disc 2 and the output side disc 4, respectively, changes. With the change in the direction of this force, the trunnions 6, 6 rock in opposite directions in FIG. 10 about the pivot shafts 5, 5 pivotally supported on the yokes 20, 20. As the result, as shown in FIGS. 8 and 9, the positions of contact between the peripheral surfaces 8a, 8a of the power rollers 8, 8 and the above-mentioned inner sides 2a, 4a change, and the rotational speed ratio between the input shaft 15 and the output gear 18 changes.

When the power rollers 8, 8 are displaced axially of the input shaft 15, the displacement shafts 7, 7 pivotally supporting the power rollers 8, 8 slightly rock about the support shaft portions 28, 28. As the result of this rocking movement, the outer sides of the outer races 33, 33 of the thrust ball bearings 32, 32 and the inner sides of the trunnions 6, 6 are displaced relative to each other. The thrust needle bearings 34, 34 are present between these outer sides and inner sides and therefore, the force required for this relative displacement is small. Accordingly, the force for varying the angles of inclination of the displacement shafts 7, 7 as described above may be small.

In the case of the toroidal type continuously variable transmission constructed and acting as described above, when the torque to be transmitted becomes excessively great, there is the possibility that the durability of the outer races 33, 33 of the thrust ball bearings 32, 32 cannot be secured on the basis of the resilient deformation of the trunnions 6, 6. During the operation of the toroidal type continuously variable transmission, a great thrust load is applied from the power rollers 8, 8 supported on the trunnions 6, 6 to the inner sides (the surfaces opposed to the input shaft 15) of the intermediate portions of the trunnions 6, 6. On the basis of this thrust load, the trunnions 6, 6 become curved in such a direction that the inner sides thereof become concave surfaces, as exaggeratedly shown in FIG. 12 of the accompanying drawings.

When such curvature occurs, the pressure of contact among the rolling surfaces of a plurality of balls 40, 40 of the thrust ball bearings 32, 32 and outer race tracks 41, 41 formed on the inner sides of the outer races 33, 33 and inner race tracks 42, 42 formed on the outer sides of the power rollers 8, 8 becomes non-uniform. Specifically, the pressure of contact among the rolling surfaces of the balls 40, 40 present on the portions toward the lengthwisely opposite ends of the trunnions 6, 6, i.e., the left and right side portions as viewed in FIGS. 11 and 12, and the outer race tracks 41, 41 and the inner race tracks 42, 42 becomes great. Conversely, the pressure of contact among the rolling surfaces of the balls 40, 40 present on the portion toward the widthwisely opposite ends of the trunnions 6, 6, i.e., the left and right side portions as viewed in FIG. 10, and the outer race tracks 41, 41 and the inner race tracks 42, 42 becomes small.

The power rollers 8, 8 and the balls 40, 40 rotate or revolve with the operation of the toroidal type continuously variable transmission and therefore, the above-mentioned rolling surfaces and the inner race tracks 42, 42 are substantially evenly subjected to a load. Accordingly, it never happens that the fatigue of these rolling surfaces and inner race tracks 42, 42 locally progresses. In contrast, the outer races 33, 33 are fitted and fixed to the continuing portion between the support shaft portion 28 and the displacement shaft portion 29 in the intermediate portion of the displacement shaft 7 and do not rotate. Therefore, great pressure of contact is always applied to the same portions (the portions near the left and right ends as viewed in FIGS. 11 and 12) of the outer race tracks 41, 41, and the fatigue of these portions locally progresses. As the result, the service life of the thrust ball bearings 32, 32 become short, and this is not preferable in securing the durability of the toroidal type continuously variable transmission.

Also, the basic construction itself of the power rollers 8, 8 and the thrust ball bearings 32, 32 incorporated in the toroidal type continuously variable transmission constructed and acting as described above can be considered to be thrust ball bearings having the power rollers 8, 8 as inner races and supporting a thrust load applied between the power rollers 8, 8 and for the outer races 33, 33 by the balls 40, 40. However, the power rollers 8, 8 and the thrust ball bearings 32, 32 incorporated in the toroidal type continuously variable transmission it is difficult to secure the durability thereof from the speciality of the form of use thereof, as compared with ordinary thrust ball bearings. The reasons for this are as stated in the following items (1) to (3).

(1) Bending stress applied to the power rollers 8, 8 and the outer races 33, 33 becomes very great. In contrast, ordinary thrust anti-friction bearings are of such structure that, for example, ten or so rolling members such as balls are evenly subjected to a thrust load, and bending stress is hardly applied to the inner and outer races therefore, the strength of the inner and outer races against the bending stress is not very important.

The peripheral surfaces 8a, 8a of the power rollers 8, 8 incorporated in the toroidal type continuously variable transmission strongly bear against the inner sides 2a and 4a of the input side disc 2 and the output side disc 4, respectively, at two circumferentially opposite locations. Therefore, a thrust load applied from these two discs 2 and 4 to the power rollers 8, 8 becomes non-uniform in the circumferential direction thereof, and great bending stress is applied to the power rollers 8, 8 and the outer races 33, 33 receiving a thrust load from these power rollers 8, 8 through the balls 40, 40.

The bending stress applied to the power rollers 8, 8 and the outer races 33, 33 in this manner differs greatly depending on the operative situation of the toroidal type continuously variable transmission, the transmitted torque, the thicknesses of the members 8 and 33, etc., and reaches the order of 100 kgf/mm$^2$ at greatest. If no countermeasure is provided for the power rollers 8, 8 and the outer races 33, 33 to which such great bending stress is applied, these members 8 and 33 will become apt to be damaged early and sufficient durability cannot be secured.

(2) In the case of the half-toroidal type continuously variable transmission as shown in FIGS. 8 to 11, the pressure of contact applied to the portions of contact among the rolling surfaces of the balls 40, 40 and the inner race track and the outer race track becomes very high. In the case of ordinary thrust anti-friction bearings, the pressure of contact $P_{max}$ on the portion of contact between the rolling surface of each rolling member and the track surface of each race is of the order of 2–3 GPa. In contrast, in the case of the thrust ball bearings 32, 32 incorporated in the toroidal type continuously variable transmission, the pressure of contact $P_{max}$ on the portions of contact among the rolling surfaces of the balls 40, 40 and the inner race track and the outer race track reaches the order of 2.5–3.5 GPa. Particularly, during the maximum deceleration as shown in FIG. 8, the pressure of contact $P_{max}$ may reach the order of 4 GPa.

When the pressure of contact $P_{max}$ becomes so great, the diameter of a contact ellipse present in the portion of contact among the rolling surfaces of the balls 40, 40 and the inner race track and the outer race track becomes large. For example, in the case of an ordinary thrust ball bearing having an outer diameter of 200 mm or less, the minor diameter of the contact ellipse is less than 1 mm, whereas in the case of the thrust ball bearings 32, 32 incorporated in the toroidal type continuously variable transmission, the minor diameter reaches the order of 1.5 mm. When the diameter of the contact ellipse thus becomes large, the depth a maximum shearing stress reaches becomes great, and unless the thickness of a hardened layer formed on the surface portions of the inner race track and outer race track is made great, the service life of these track portions cannot be secured.

(3) The portions of contact between the inner sides 2a and 4a of the input side and output side discs 2 and 4, respectively, and the peripheral surfaces 8a, 8a of the power rollers 8, 8 effect the transmission of very great power while spinning. In the case of the toroidal type continuously variable transmission which is a traction drive transmission, a contact ellipse portion having a diameter of only several millimeters present in the above-described portions of contact transmits as great power as the order of 50 kw. Moreover, spin takes place in this contact ellipse portion and therefore, great shearing stress and heat generation occur to this contact ellipse portion. Therefore, unless the strength of the above-mentioned peripheral surfaces 8a, 8a is made high, the durability of the power rollers 8, 8 cannot be sufficiently secured.

SUMMARY OF THE INVENTION

The toroidal type continuously variable transmission of the present invention has been invented in view of such circumstances.

A toroidal type continuously variable transmission according to one aspect of the present invention is comprised of an input shaft, an input side disc rotatable with the input shaft, an output side disc disposed coaxially with the input side disc and supported for rotation relative to the input side disc, a mechanism for outertting out the rotation of the output side disc, a plurality of trunnions rockable about respective axes transverse to a rotation axis of the input side and output side discs, a plurality of power rollers rotatably supported on displacement shafts supported by the trunnions and held between the input side and output side discs, and a thrust anti-friction bearing provided between the outer side of each power roller and the inner side of each trunnion and permitting the rotation of each power roller while supporting a thrust load applied to each power roller. The inner sides of the input side and output side discs which are opposed to each other are made into concave surfaces of an arcuate cross-sectional shape and the peripheral surface of each power roller is made into a spherical convex surface, and each peripheral surface and the inner sides are made to bear against each other.

Particularly, in the toroidal type continuously variable transmission of the present invention, a circular ring-like outer race of each of the thrust anti-friction bearings is supported around the intermediate portion of each of the displacement shafts for rotation about each displacement shaft.

The action when the transmission of a rotational force is effected between the input side disc and the output side disc by the toroidal type continuously variable transmission of the present invention constructed as described above and the action when the transmission gear ratio between these two discs is changed are similar to those in the case of the prior-art toroidal type continuously variable transmission described previously.

Particularly, in the case of the toroidal type continuously variable transmission of the present invention, the outer race of each thrust anti-friction bearing is rotatably supported around the displacement shaft and therefore, that portion of the outer race track which receives a great thrust load from the rolling member (that portion in which the pressure of contact with the rolling surface is great) always changes. As the result, it never happens that the outer race track is locally fatigued (the fatigue of the outer race track progresses evenly over the entire circumference), and the extension of the service life of the outer race track can be achieved.

A toroidal type continuously variable transmission according to another aspect of the present invention satisfies at least one of the following conditions (a) to (e):

(a) a hardened layer by heat treatment is formed on the surface of each power roller, and on the continuing portion between the inner peripheral surface and the inner side of each power roller, a chamfered portion in which the axial dimension of each power roller is 15% or less of the axial dimension of all the power rollers is formed after the hardened layer has been formed, and of the hardened layer, an abnormally heat-treated layer is removed by formation of the chamfered portion;

(b) a hardened layer by heat treatment is formed on the surface of each power roller, and on the continuing portion between the inner peripheral surface and the inner side of each power roller, shot peening is done after the hardened layer has been formed, and residual compressive stress based on this shot peening exists on this continuing portion;

(c) the peripheral surface of each power roller is made into a smooth surface of which the roughness is 0.05 Ra or less by super-finish;

(d) the inner race track of the thrust anti-friction bearing formed on the outer side of each power roller and the outer race track formed on the inner side of the outer race provided on the inner side of each trunnion are made into smooth surfaces of which the roughness is 0.05 Ra or less; and (e) the outer race of the thrust anti-friction bearing is provided on the inner side of each trunnion, and a hardened layer of which the hardness is Hv 550 or greater is formed on the peripheral surface of each power roller and the inner race track portion formed on the outer side of each power roller up to a range of 2–4 mm from each of these surfaces, and a similar hardened layer is formed on the outer race track portion formed on the inner side of the outer race up to a range of 0.7–1.5 mm from the surface.

The action when the toroidal type continuously variable transmission of the present invention constructed as described above transmits a rotational force between the input side disc and the output side disc and the action when it changes the transmission gear ratio between the input side disc and the output side disc are similar to those of the aforedescribed prior-art structure.

Particularly, in the case of the toroidal type continuously variable transmission of the present invention, the requirements (a) to (e) are satisfied with respect to the power rollers and the thrust anti-friction bearing supporting a thrust load applied to these power rollers, whereby the durability of these power rollers or the thrust anti-friction bearing can be improved.

DESCRIPTION OF THE PREFERRED EMBODIMENTS

Figure 1:
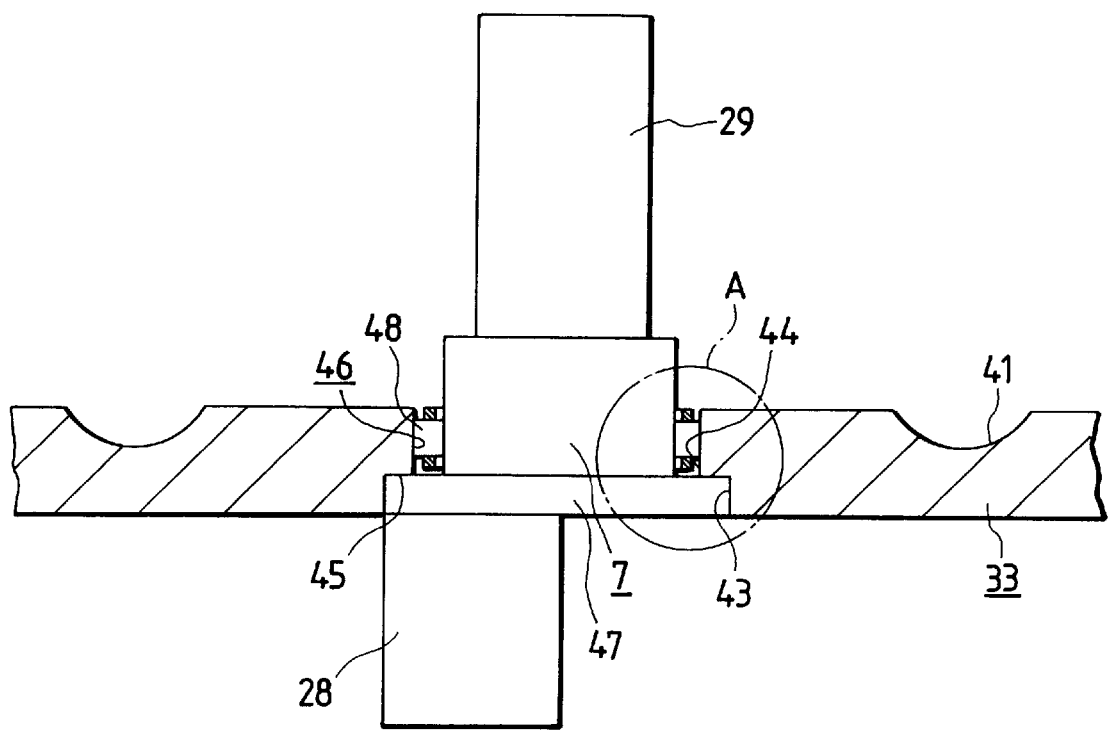
FIG. 1 is a fragmentary cross-sectional view of a displacement shaft and an outer race of an embodiment of the present invention.
Figure 2:
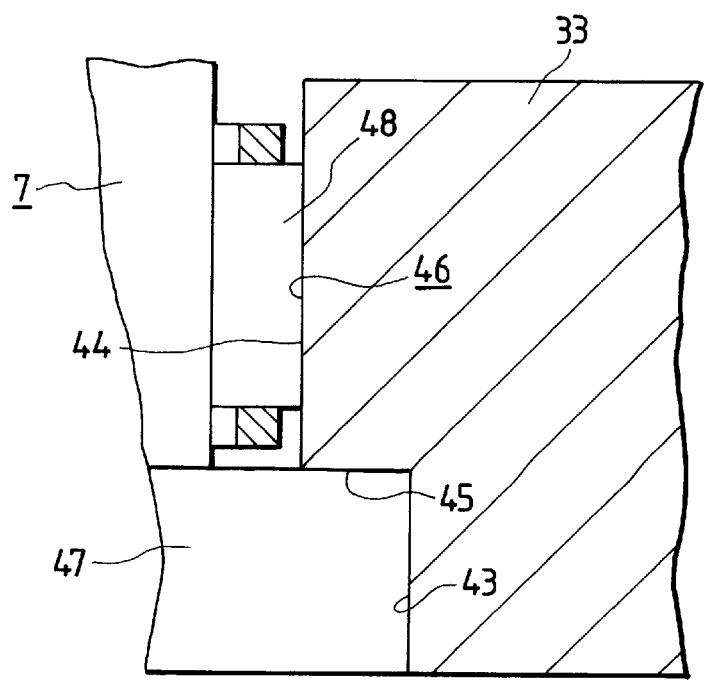
FIG. 2 is an enlarged view of the portion A of FIG. 1.
Figure 3:
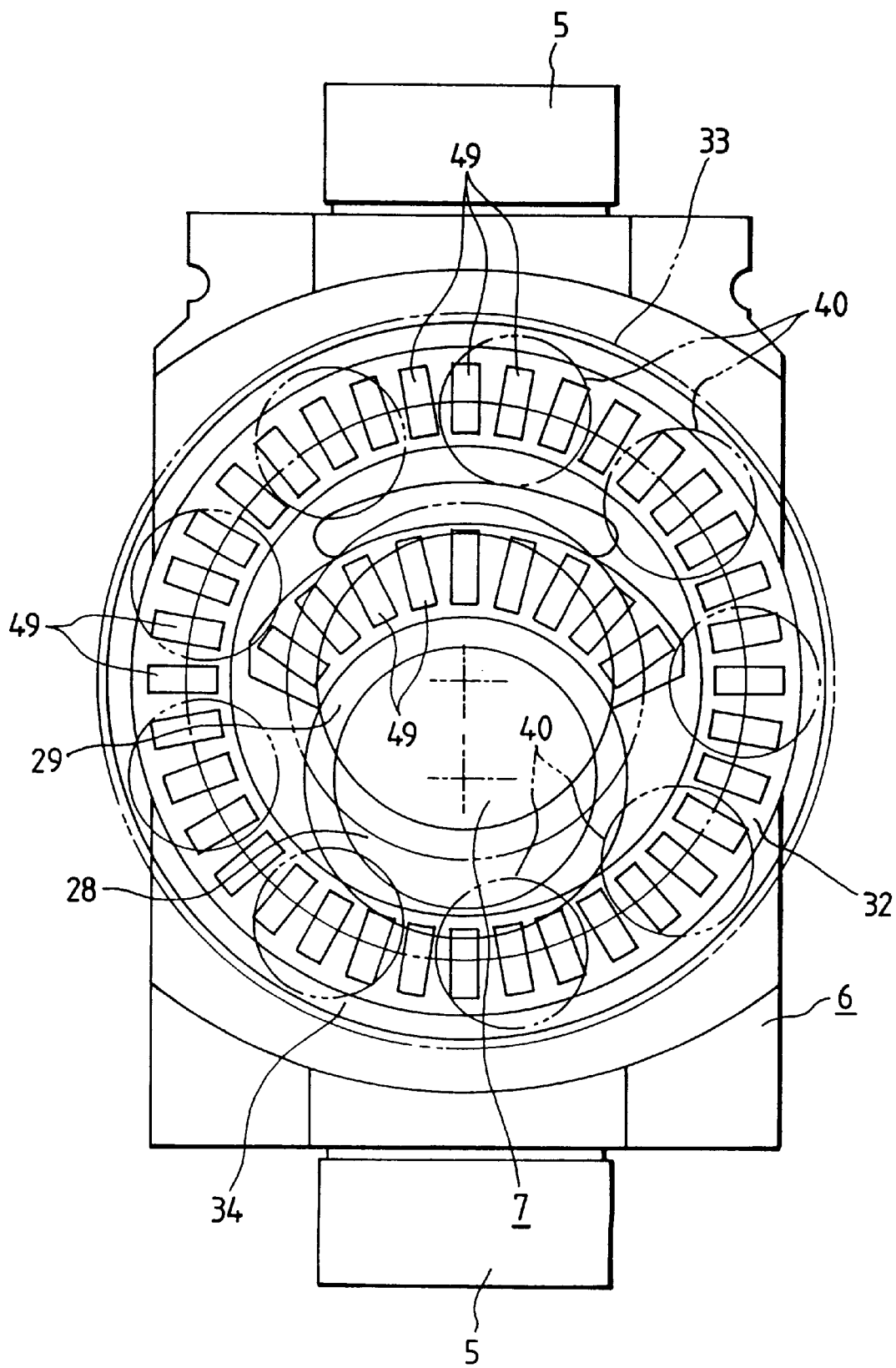
FIG. 3 is a view of the inner side portion of a trunnion having a thrust ball bearing and a thrust needle bearing incorporated therein.
Figure 10:
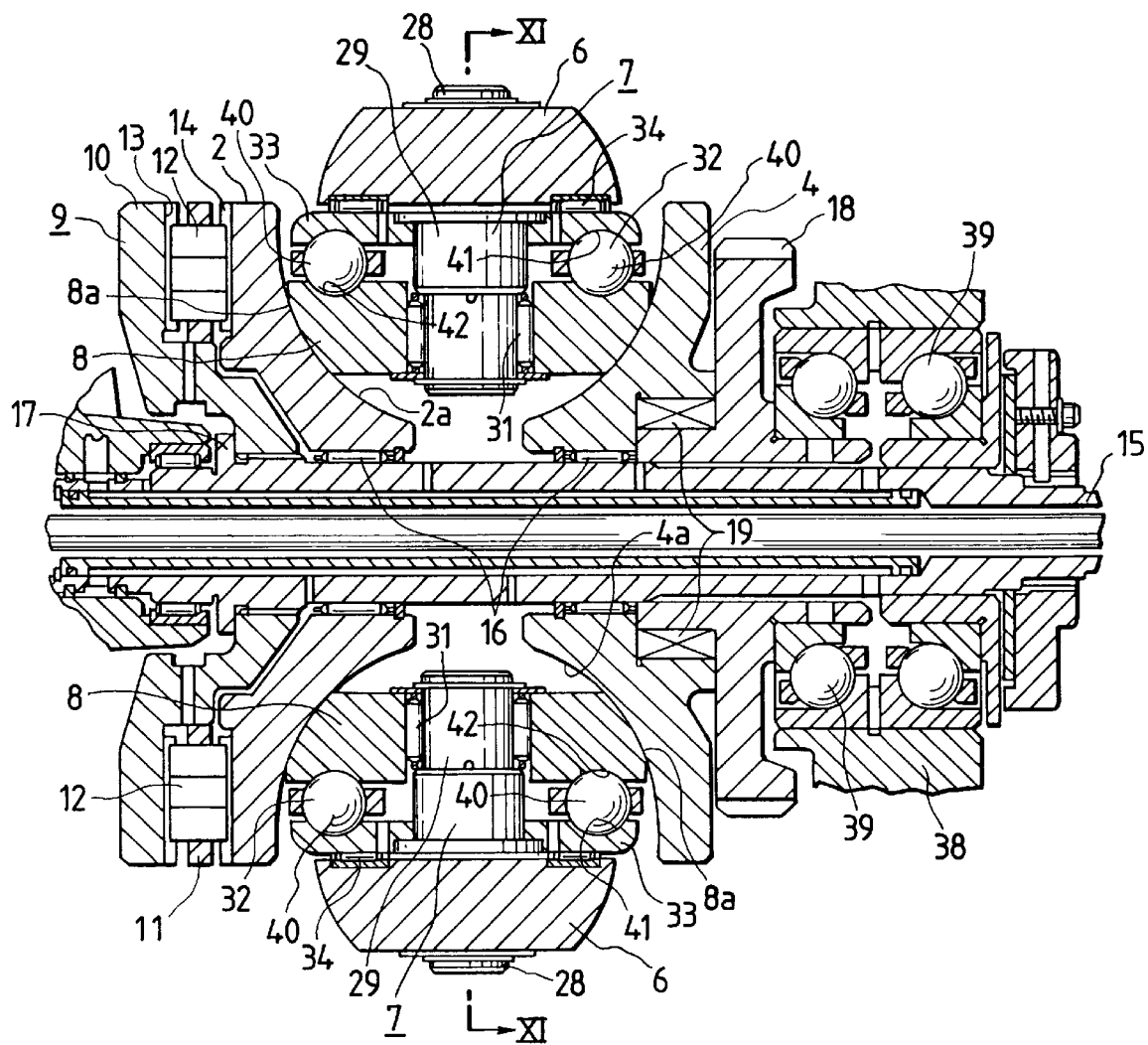
FIG. 10 is a cross-sectional view of essential portions showing an example of the heretofore known specific structure.
Figure 11:
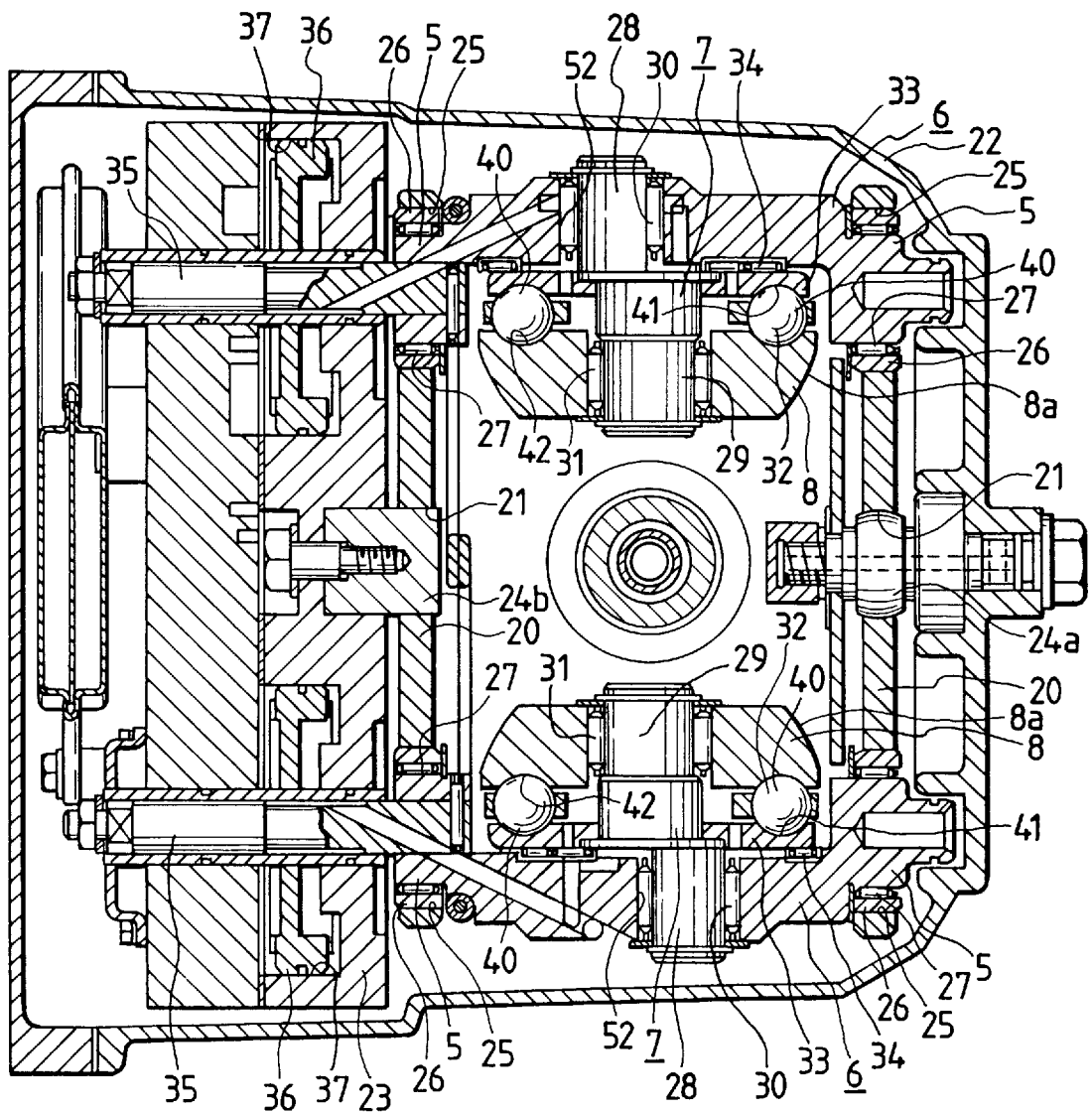
FIG. 11 is a cross-sectional view taken along the line XI—XI of FIG. 10.
Figure 12:
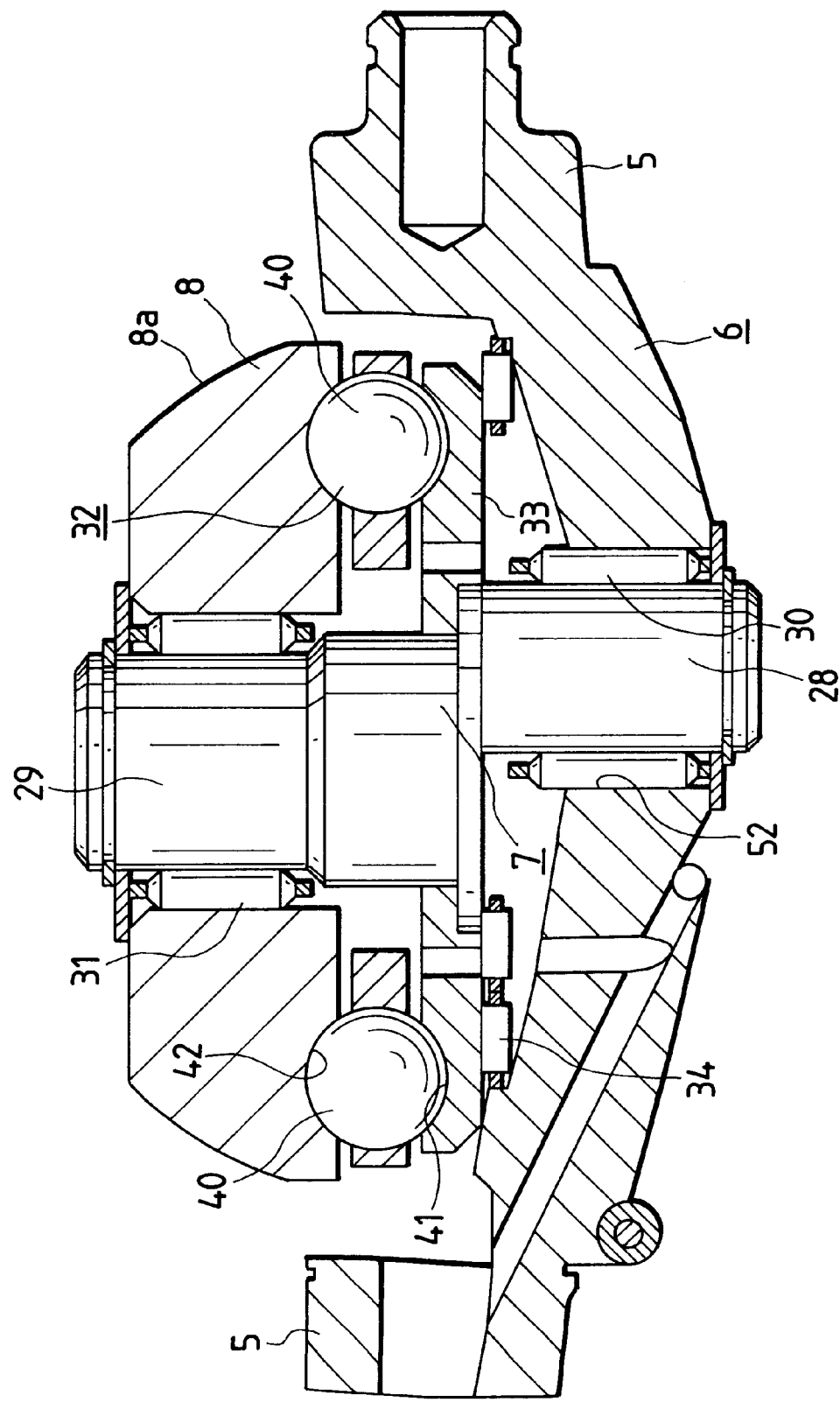
FIG. 12 is a side view taken from the same direction as FIG. 11 but exaggeratively showing a state in which a trunnion has been resiliently deformed on the basis of a thrust load acting during operation.

FIGS. 1 to 3 show an embodiment of the present invention. The feature of the present invention is that an outer race 33 of each of thrust ball bearings 32, 32 (see FIGS. 10 to 12), which are thrust anti-friction bearings, is supported for rotation relative to a displacement shaft 7 to thereby extend the anti-friction life of an outer race track 41 formed on the inner side (the upper surface as viewed in FIG. 1) of the outer race 33. In the other points, the structure and action of the present embodiment are similar to those of the aforedescribed example of the prior art and therefore, the showing and description of like portions are omitted or simplified and hereinafter, chiefly the characteristic portions of the present invention will be described.

The annular outer race 33 of each of the thrust ball bearings 32 is supported around the intermediate portion of the displacement shaft 7 and the continuing portion between a support shaft portion 28 and a pivot shaft portion 29 for rotation about the displacement shaft 7. Therefore, a circular central hole 46 comprising a large-diametered portion 43 and a small-diametered portion 44 connected to each other by a stepped portion 45 is formed in the central portion of the outer race 33. The large-diametered portion 43 of this central hole 46 is fitted by clearance fit on an outwardly directed flange-like and circular flange portion 47 formed on the intermediate portion of the displacement shaft 7. Therefore, the inner diameter of the large-diametered portion 43 is made slightly larger than the outer diameter of the flange portion 47. Also, the inner diameter of the small-diametered portion 44 is made sufficiently larger than the outer diameter of the base end portion (the lower end portion as viewed in FIG. 1) of the pivot shaft portion 29, and a radial bearing such as a radial needle bearing 48 or a radial slide bearing bushing using an alloy of the copper origin is provided between the outer peripheral surface of the base end portion of the pivot shaft portion 29 and the inner peripheral surface of the small-diametered portion 44.

A thrust needle bearing 34 (see FIGS. 3 and 10 to 12) is provided between the outer side (the lower surface as viewed in FIGS. 1 and 2) of the outer race 33 and the trunnion 6 (see FIGS. 10 to 12) and therefore, the rotation of the outer race 33 around the displacement shaft 7 is effected smoothly irrespective of a thrust load applied to the outer race 33. To effect this rotation smoothly, it is preferable that as shown in FIG. 3, a plurality of needles 49, 49 constituting the thrust needle bearing 34 which bear against the outer side of the outer race 33 be disposed radially about the support shaft portion 28. If the needles 49, 49 are thus disposed, these needles 49, 49 can roll smoothly during the rotation of the outer race 33 about the support shaft portion 28 and the rotation of the outer race 33 around the displacement shaft 7 can be effected smoothly. The direction of arrangement of the needles 49, 49 and the radial direction about the support shaft portion 28 can coincide with each other in a state in which the displacement shaft 7 exists in a neutral position (the position shown in FIG. 3).

By the radial needle bearing 48 and the thrust needle bearing 34, the stepped portion 45 and one side (the upper surface as viewed in FIGS. 1 and 2) of the flange portion 47 bear against or become proximate to each other in a state in which the outer race 33 is rotatably supported around the intermediate portion of the displacement shaft 7. These two surfaces and the inner peripheral surface of the large-diametered portion 43 and the outer peripheral surface of the flange portion 47 are made smooth so that even when these surfaces opposed to each other bear against each other, the rotation of the outer race 33 around the displacement shaft 7 may be effected smoothly. However, if the rotational speed of the outer race 33 relative to the displacement shaft 7 becomes too high, the wear of the portion of contact between the stepped portion 45 and one side of the flange portion 47 will become apt to progress and other problems will arise in terms of durability. That is, the present invention rotates the outer race 33 relative to the displacement shaft 7 to thereby achieve the increased durability of an outer race track 41 provided on the inner side of this outer race 33, but it is preferable that the rotational speed of the outer race 33 relative to the displacement shaft 7 be as low as possible (e.g. the order of 1 to several r.p.m.) as far as the rotation is effected stably. So, suitable wear resistance is imparted to the portion of contact between the stepped portion 45 and one side of the flange portion 47, and if necessary, the portion of contact between the inner peripheral surface of the large-diametered portion 43 and the outer peripheral surface of the flange portion 47, whereby the rotational speed of the outer race 33 relative to the displacement shaft 7 is adjusted. Also, if required, a friction adjusting member having a desired coefficient of friction may be held on one or both of the portions of contact.

Also, it is preferable that the portion of contact between the stepped portion 45 and one side of the flange portion 47, and if necessary, the portion of contact between the inner peripheral surface of the large-diametered portion 43 and the outer peripheral surface of the flange portion 47, be subjected to treatment for preventing the wear of each surface constituting these portions of contact. As such treatment, it is conceivable to form (particularly the flange portion 47 of) the displacement shaft 7 and (particularly the inner diameter side portion of) the outer race 33 from a material having an excellent wear resisting property or to subject the surface constituting the portions of contact to surface treatment providing a wear resisting property such as nitriding treatment.

In the case of the toroidal type continuously variable transmission of the present invention constructed as described above, the outer race 33 of each of the thrust ball bearings 32, 32 is rotatably supported around the intermediate portion of the displacement shaft 7 and therefore, the outer race 33 rotates on the basis of the anti-friction resistance of the thrust ball bearings 32, 32. Therefore, that portion of the outer race track 41 provided on the inner side of the outer race 33 which receives a great thrust load from balls 40, 40 (see FIGS. 10 to 12) which are rolling members always changes. Accordingly, it never happens that the outer race track 41 is locally fatigued. In other words, the fatigue of the outer race track 41 evenly progresses over the full circumference thereof. As the result, the extension of the anti-friction life as the entire outer race track 41 can be achieved.

Figure 4:
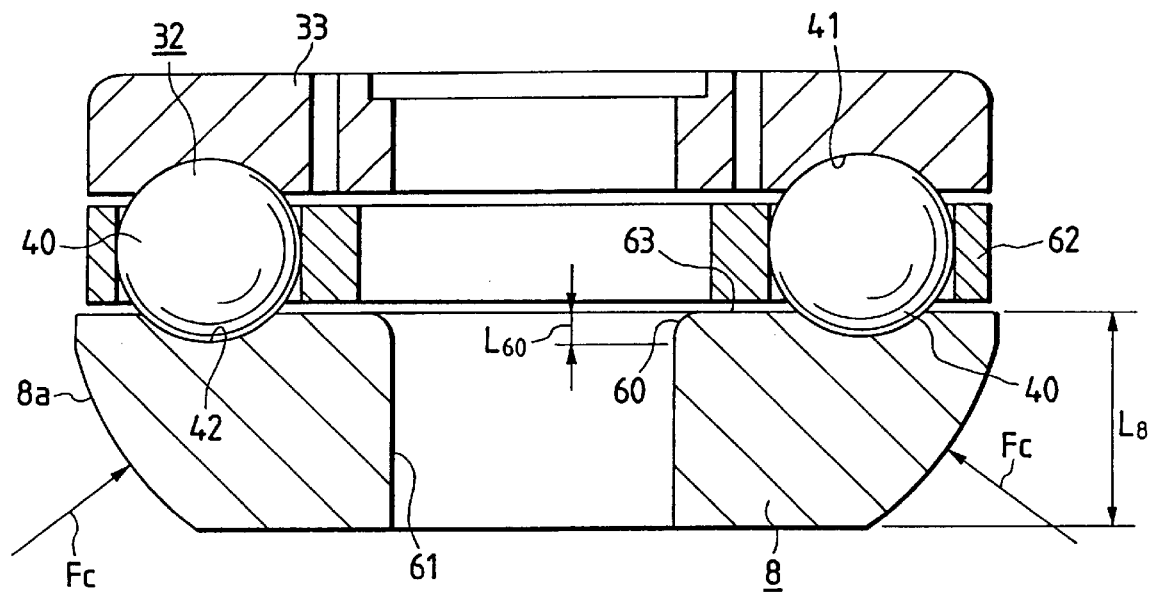
FIG. 4 is a cross-sectional view showing another embodiment of the present invention, and more particularly showing a power roller and a thrust ball bearing incorporated in a toroidal type continuously variable transmission.

FIG. 4 shows a power roller 8 and a thrust ball bearing 32 of a toroidal type continuously variable transmission according to another embodiment of the present invention. This thrust ball bearing 32 comprises a plurality of balls 40, 40 held by an annular holder 62 and provided for rolling between an inner race track 42 formed on the outer side (the upper surface as viewed in FIG. 4) of the power roller 8 and an outer race track 41 formed on the inner side (the lower surface as viewed in FIG. 4) of an outer race 33 provided on the inner side of a trunnion 6 (FIGS. 8 to 11). The peripheral surface 8a of the power roller 8 is made into a spherical convex surface, and this peripheral surface 8a bears against the inner sides 2a and 4a (FIGS. 8 to 10) of the input side and output side discs 2 and 4, whereby the transmission of power between these two discs 2 and 4 is made freely possible.

The surface of the power roller 8 is formed with a hardened layer by heat treatment (item (a) described previously). Also, a chamfered portion 60 having a cross-sectional shape of a quarter arc is formed on the connecting portion between the inner peripheral surface 61 and the inner side 63 of the power roller 8. The dimension $L_{60}$ of this chamfered portion 60 in the axial direction of the power roller 8 is 15% or less of the axial dimension $L_8$ of the entire power roller 8 ($L_{60} \leq 0.15 L_8$). This chamfered portion 60 is formed after the hardened layer has been formed on the surface of the power roller 8. An abnormally heat-treated layer in this hardened layer is removed by the formation of chamfered portion 60. The inner peripheral surface 61 is a smooth surface of which the surface roughness is 0.2 Ra or less.

The chamfered portion 60 satisfying the conditions as described above is formed on the inner peripheral edge portion of the inner side of the power roller 8. Consequently, even when during the operation of the toroidal type continuously variable transmission, great bending stress is applied to the power roller 8, any damage such as cracking is prevented from occurring to the inner peripheral edge portion of the inner side of this power roller 8. In more detail, when on the basis of a great urging force $F_c$ applied to two locations on the peripheral surface 8a side, bending stress is applied to the power roller 8, great stress (tensile stress) concentrates in the inner peripheral edge portion of the inner side. Also, when heat treatment such as induction hardening or cementation hardening is effected to harden the surface of the power roller 8, an abnormally heat-treated layer having internal strain left therein will remain on the inner peripheral edge portion of the inner side. If such an abnormally heat-treated layer exists, damage such as cracking will occur to the inner peripheral edge portion of the inner side due to the concentration of stress resulting from the above-mentioned bending stress, and the power roller 8 will be subjected to damage such as fracture.

Figure 5:
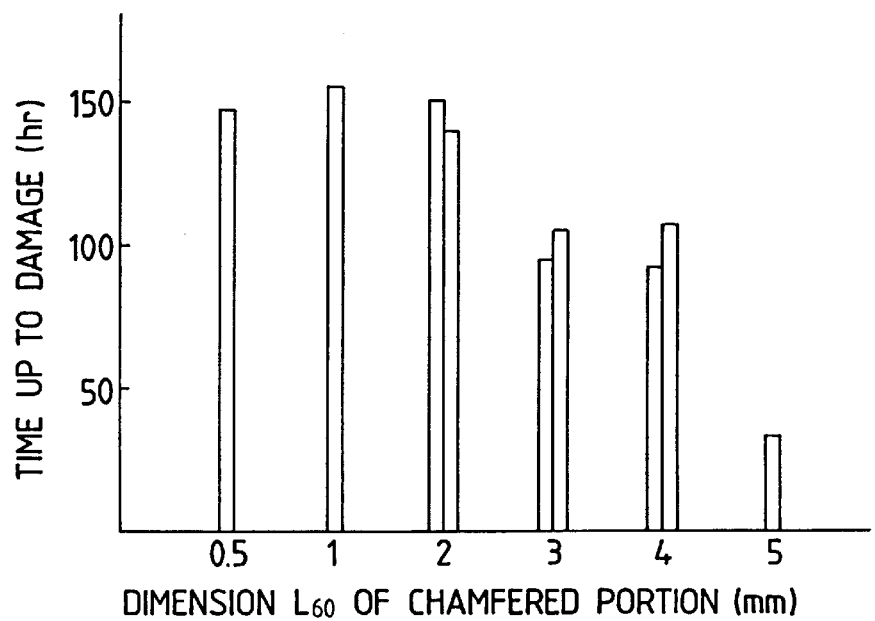
FIG. 5 is a bar graph showing the result of an experiment carried out to examine the influence of the dimension of a chamfered portion upon the durability of a power roller.

In contrast, if the power roller 8 is subjected to heat treatment as described above, whereafter the chamfered portion 60 is formed and the hardened layer present on the inner peripheral edge portion of the inner side is removed and the above-mentioned abnormally heat-treated layer present on this hardened layer portion is removed, the power roller 8 can be prevented from being subjected to damage such as fracture by the cause as described above. However, if the chamfered portion 60 is made too large, the volume of the power roller 8 will correspondingly decrease and the portion receiving the bending stress will become small and the stress applied to the remaining portion will become great. Then, the durability of the power roller 8 will be reduced. The inventors carried out an experiment in which the dimension $L_{60}$ of the chamfered portion 60 relative to the axial dimension $L_8$ of the entire power roller 8 was, whereby the influence of the dimension $L_{60}$ upon the durability of the power roller 8 was examined. The results as shown in the Table 1 below and FIG. 5, were obtained. The axial dimension $L_8$ of the entire power roller 8 was 22 mm and the dimension $L_{60}$ of the chamfered portion 60 was changed within a range of 0.5–5 mm and the time up to the damage of the power roller 8 was measured.

TABLE 1

| dimension of chamfered portion (mm) | result of durability test | determination |
|---|---|---|
| 0.5 | not damaged in 147 hours | OK |
| 1 | not damaged in 155 hours | OK |
| 2 | not damaged in 150 hours | OK |
| 2 | not damaged in 139 hours | OK |
| 3 | not damaged in 97 hours | OK |
| 3 | not damaged in 106 hours | OK |
| 4 | not damaged in 92 hours | NG |
| 4 | not damaged in 107 hours | OK |
| 5 | damaged in 32 hours | NG |

From this experiment, it is seen that if the dimension $L_{60}$ of this chamfered portion 60 in the axial direction of the power roller 8 is 15% or less of the axial dimension $L_8$ of the entire power roller 8, the durability of the power roller 8 can be sufficiently improved with respect to damage occurring from the inner peripheral edge portion of the inner side. However, the dimension $L_{60}$ of the chamfered portion 60 must be enough to be able to remove at least the abnormally heat-treated layer in the hardened layer.

Alternatively, a hardened layer by heat treatment can be formed on the surface of the power roller 8, and after the hardened layer has been formed, the connecting portion (the inner peripheral edge portion of the inner side) between the inner peripheral surface 61 and the inner side 63 of this power roller 8 can be subjected to shot peening. Residual compressive stress based on this shot peening is made to exist in the above-mentioned continuing portion (item (b) previously described).

When as described above, the residual compressive stress is made to exist in the connecting portion between the inner peripheral surface 61 and the inner side 63 of the power roller 8, any damage such as cracks will not occur from the connecting portion even if during the operation of the toroidal type continuously variable transmission, bending stress is applied to the roller 8. That is, when the power the residual compressive stress is made to exist in the connecting portion, this residual compressive stress will offset tensile stress and the damage such as cracking will not readily occur. The compressive stress made residual in the connecting portion by shot peening is preferably of the order of at least 20–70 kgf/mm$^2$, and more preferably of the order of 100 kgf/mm$^2$. Also, the shot peening can be effected only on the connecting portion in which (tensile) stress concentrates during the operation of the toroidal type continuously variable transmission. However, if the shot peening is effected on this connecting portion, there is the possibility that the inner peripheral surface 61 serving as the outer race track of the radial needle bearing 31 (FIGS. 10 and 11) will become rough. However, this inner peripheral surface is subjected to the finishing work by grinding after the shot peening process and therefore, it never happens that the durability of the radial needle bearing 31 is spoiled by the shot peening. Also, when as described above, the residual compressive stress is made to exist in the connecting portion by the shot peening, it is not necessary to form the chamfered portion 60 as described above in this connecting portion after the heat treatment. However, if both of the formation of the chamfered portion 60 and the provision of the residual compressive stress by the shot peening are effected, more excellent durability can be secured.

Also, the peripheral surface 8a of the power roller 8 is made into a smooth surface of which the roughness is 0.05 Ra or less by super-finish (item (c) previously described). As previously described, the outer peripheral surface 8a effects the transmission of very great power while spinning in the portion of contact between the inner sides 2a and 4a of the input side and output side discs 2 and 4, respectively. On the basis of such spin, the portion of contact generates heat and oil film becomes difficult to be formed on this portion of contact. To secure the anti-friction life of the peripheral surface 8a, it is necessary to suppress such heat generation and make oil film easy to be formed on the portion of contact. If as described above, the peripheral surface 8a is made into a smooth surface, the oil film can be made easy to form and the anti-friction life of this peripheral surface 8a can be secured.

Figure 6:
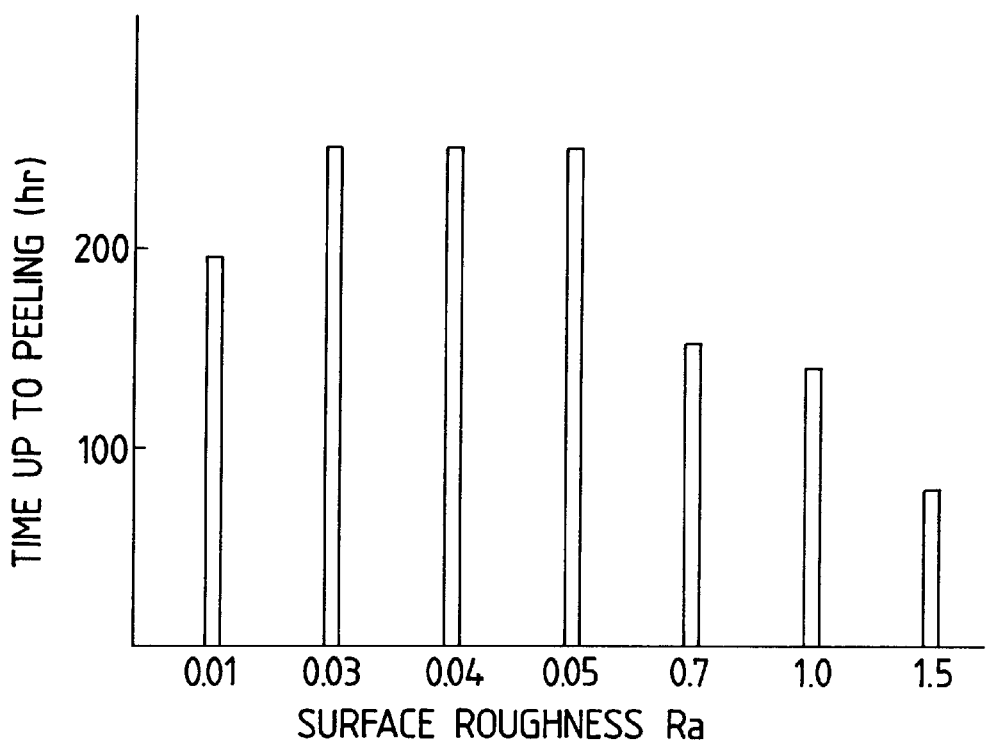
FIG. 6 is a bar graph showing the result of an experiment carried out to examine the influence of the roughness of the peripheral surface of the power roller upon the life of this peripheral surface.

When the inventors carried out an experiment of variously changing the surface roughness of the peripheral surface 8a to thereby examine the influence of this surface roughness upon the durability of the power roller 8, there were obtained results as shown in Table 2 below and FIG. 6. In this experiment, the surface roughness of the peripheral surface 8a was changed within a range of 0.01–1.5 Ra, and the time until this peripheral surface 8a peeled was measured. The surface roughness of 0.01–0.05 Ra shows what is by super-finish, and the surface roughness of 0.7–1.5 Ra shows what is not by super-finish.

TABLE 2

| working | surface roughness (μm) | result of durability test | determination |
|---|---|---|---|
| super-finished | 0.05 | not damaged in 250 hours | OK |
| super-finished | 0.04 | not damaged in 250 hours | OK |
| super-finished | 0.03 | not damaged in 250 hours | OK |
| super-finished | 0.01 | not damaged in 195 hours | OK |
| not super-finished | 0.7 | peeled in 152 hours | NG |
| not super-finished | 1.0 | peeled in 141 hours | NG |
| not super-finished | 1.5 | peeled in 79 hours | NG |

From this experiment, it is seen that if the surface roughness of the peripheral surface is 0.05 Ra or less, the time required until this peripheral surface 8a peels can be made long and the durability of the power roller 8 can be sufficiently secured.

Also, the inner race track 42 of the thrust anti-friction bearing formed on the outer side of the power roller 8 and the outer race track 41 formed on the inner side of the outer race 33 are made into smooth surfaces of which the roughness is 0.05 Ra or less by super-finish. By the tracks 41 and 42 being thus made into smooth surfaces, oil film becomes easy to be formed on the portions of contact between these tracks 41, 42 and the rolling surfaces of the balls 40, 40 so that the anti-friction life of these tracks 41, 42 and the rolling surfaces may be secured. Particularly, in the case of the half-toroidal type continuously variable transmission to which the present invention is directed, an urging force $F_c$ in a normal direction as indicated by an arrow in FIG. 4 is applied to the peripheral surface 8a of the power roller 8, and of this urging force Fc, a component force in the axial direction of the power roller 8 is applied as a thrust load to the power roller 8. Moreover, the rotational speed of the power roller 8 becomes higher than the rotational speed of an engine and reaches 10000 r.p.m. or greater when the toroidal type continuously variable transmission is on the acceleration side. Accordingly, the lubricating condition of the portions of contact between the tracks 41, 42 and the rolling surfaces of the balls 40, 40 becomes very severe. In order to solve the problem peculiar to the thrust ball bearing 32 incorporated in such a half-toroidal type continuously variable transmission, the tracks 41 and 42 are made smooth as described above to thereby make oil film easy to form on the portions of contact. Thus, the durability of the thrust ball bearing 32 is secured.

Figure 7:
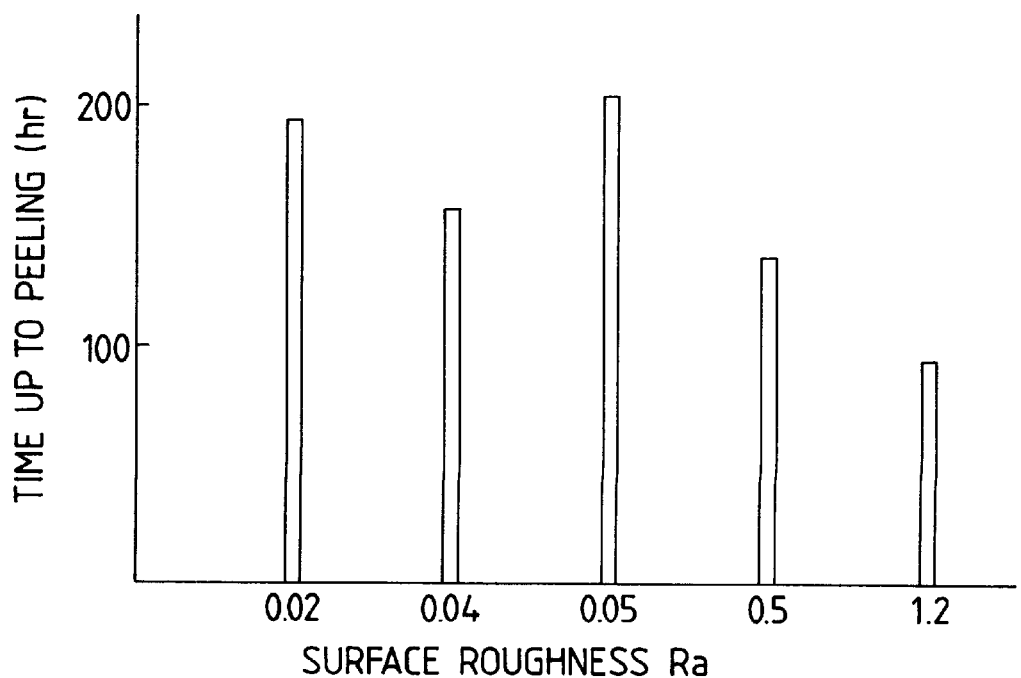
FIG. 7 is a bar graph showing the result of an experiment carried out to examine the influence of the roughness of the raceway surface of a thrust ball bearing upon the life of the raceway.
Figure 8:
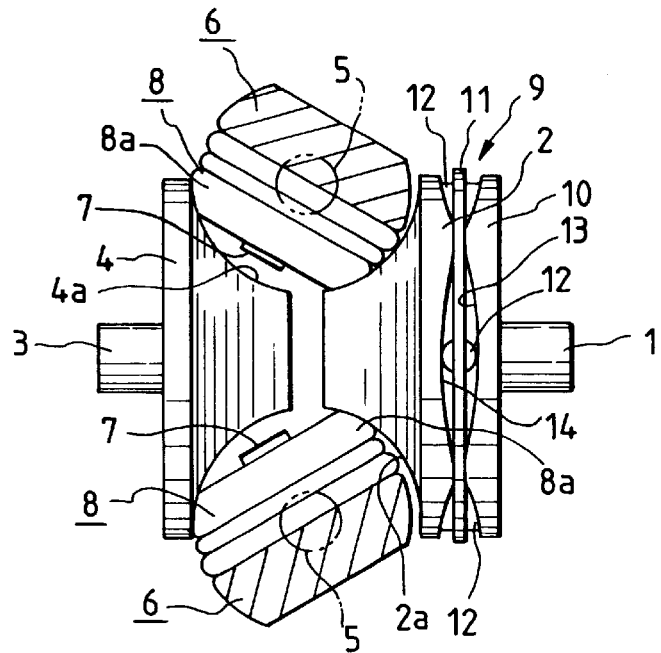
FIG. 8 is a side view showing the basic construction of the toroidal type continuously variable transmission in the state during maximum deceleration.
Figure 9:
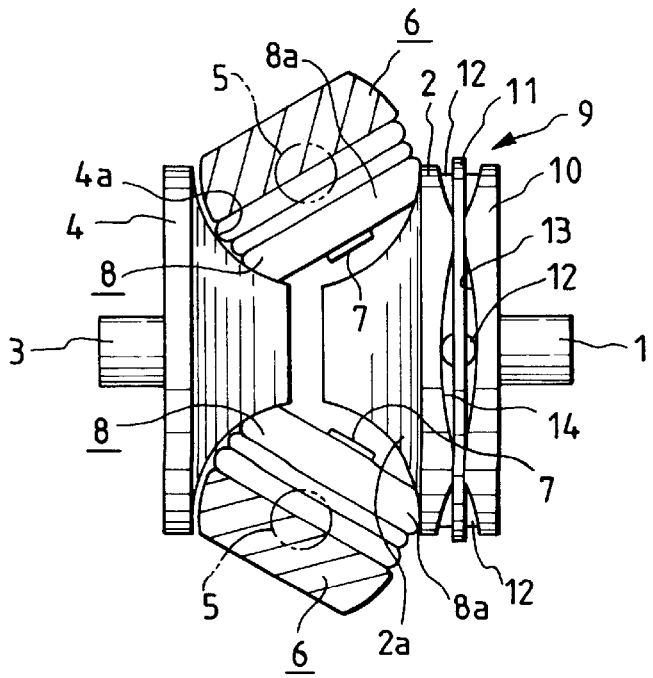
FIG. 9 is a side view showing the basic construction of the toroidal type continuously variable transmission in the state during maximum acceleration.

When the inventors carried out an experiment of variously changing the surface roughness of the tracks 42, 41 to thereby examine the influence of this surface roughness upon the durability of the thrust ball bearing 32, there were obtained results as shown in Table 3 below and FIG. 7. In this experiment, the surface roughness of the tracks 41, 42 was variously changed and the time until the tracks 41, 42 came to peel was measured. The tracks 41, 42 when worked by super-finish exhibited surface roughness of 0.01–0.05 Ra, while the tracks 41, 42 when not worked by superfinish exhibited surface roughness of 0.7–1.5 Ra, which means being rougher by one figure than when worked by super-finish. The angle of contact of the thrust ball bearing 32 was 90°.

TABLE 3

| working | surface roughness (μm) | result of durability test | determination |
|---|---|---|---|
| super-finished | 0.05 | not damaged in 202 hours | OK |
| super-finished | 0.04 | not damaged in 157 hours | OK |
| super-finished | 0.02 | not damaged in 194 hours | OK |
| not super-finished | 0.5 | peeled in 138 hours | NG |
| not super-finished | 1.2 | peeled in 92 hours | NG |

From this experiment, it is seen that if the surface roughness of the tracks 41, 42 is 0.05 Ra or less, the time required until these tracks peel can be lengthened and the durability of the thrust ball bearing 32 can be sufficiently improved.

Also, on the peripheral surface 8a of the power roller 8 and the inner race track 42 formed on the outer side of this power roller 8, a hardened layer of which the hardness is Hv 550 or greater is formed to a range of 2–4 mm from these surfaces. In contrast, on the outer race track 41 formed on the inner side of the outer race 33 constituting the thrust ball bearing 32, a similar hardened layer is formed to a range of 0.7–1.5 mm from the surface. As previously described, in the case of the half-toroidal type continuously variable transmission to which the present invention is directed, pressure of contact applied to the portions of contact among the rolling surfaces of the balls 40, 40 and the inner race track and the outer race track becomes very high and the diameter of contact ellipses present in the portions of contact among the rolling surfaces of the balls 40, 40 and the inner race track and the outer race track becomes large, and the depth the maximum shearing stress reaches becomes great. Also, a contact ellipse portion having a diameter of only several millimeters which is present in the portions of contact between the inner sides 2a and 4a of the input side and output side discs 2 and 4, respectively, and the peripheral surface 8a of the power roller 8 effects the transmission of very great power while spinning. Accordingly, to secure the anti-friction life (peel life) of the tracks 41, 42 and the peripheral surface 8a, it is necessary that the thickness of the hardened layer on the surface portions of the tracks 41, 42 and the peripheral surface 8a be made great as compared with that of an ordinary thrust anti-friction bearing.

Of the contact ellipses, the major diameter of the contact ellipses present in the portions of contact among the rolling surfaces of the balls 40, 40 and the inner race track and the outer race track is of the order of 3–4 mm, and the major diameter of the contact ellipses present in the portions of contact between the inner sides 2a, 4a and the peripheral surface 8a of the power roller 8 is of the order of 10 mm. The depth the aforementioned maximum shearing stress reaches becomes greater as the diameter of the contact ellipse becomes larger and therefore, in order that the anti-friction lives of the tracks 41, 42 and the peripheral surface 8a may be of the same degree, the hardened layer on the surface portion of the peripheral surface 8a should be thicker than the hardened layers on the surface portions of the tracks 41 and 42. Both of the peripheral surface 8a and the inner race track 42 are present on the surface of the power roller 8 and therefore, it is cumbersome and not practical to change the thickness of the hardened layer. In contrast, if the thickness of the hardened layer on the outer race track 41 portion formed on the inner surface of the outer race 33 which is thin as compared with the power roller 8 is made too great, the thickness of the other portion than the hardened layer will become small and the tenacity of the outer race 33 cannot be secured, and the fatigue destruction strength of this outer race 33 will be reduced. So, as previously described, the thickness of the hardened layers on the peripheral surface 8a and the inner race track 42 portion was set to 2–4 mm, and the thickness of the hardened layer on the outer race track 41 portion was set to 0.7–1.5 mm. Thereby, the anti-friction lives of the peripheral surface 8a and the inner and outer race tracks 42 and 41 and the fatigue destruction strength of the outer race 33 can be compatiblity secured.

According to the above-described embodiments of the present invention, there are obtained the following effects.

The present invention, which is constructed and acts as described above, can contribute to improving the durability of the outer race of the thrust anti-friction bearing and improving the reliability and durability of the toroidal type continuously variable transmission incorporating this outer race therein.

The present invention, which is constructed and acts as described above, can improve the durability of the power rollers and the thrust anti-friction bearing and can achieve the improved durability of the toroidal type continuously variable transmission incorporating these power rollers and thrust anti-friction bearing therein.

While the present invention has been described above in detail with respect to the embodiments thereof, the present invention is not restricted to the above-described embodiments, but of course permits various modification within the scope of the invention.

What is claimed is:

1. A toroidal continuously variable transmission, comprising an input shaft, an input side disc rotatable with the input shaft, an output side disc disposed coaxially with the input side disc and supported for rotation relative to the input side disc, a plurality of trunnions rockable about respective pivot axes transverse to a center axis of the input side and output side discs, a plurality of power rollers each rotatably supported on a corresponding displacement shaft supported by a corresponding one of said trunnions, and held between the input side and output side discs, and a respective thrust anti-friction bearing provided between an outer side of each power roller and an inner side of the corresponding trunnion and permitting rotation of that power roller while supporting a thrust load applied to that power roller, inner sides of the input side and output side discs which are opposed to each other being made into concave surfaces of an arcuate cross-sectional shape, a peripheral surface of each power roller being made into a spherical convex surface, each said peripheral surface and said inner sides being made to bear against each other, characterized in that each said thrust anti-friction bearing has an annular outer race rotatably supported on an intermediate portion of the corresponding displacement shaft by a bearing member disposed between said outer race and said intermediate portion of the corresponding displacement shaft.

2. A toroidal continuously variable transmission according to claim 1, characterized in that the said outer race is rotatably supported on said intermediate portion of the corresponding displacement shaft by a bushing.

3. A toroidal continuously variable transmission, comprising a rotatably supported input shaft, an input side disc rotatable with said input shaft, an output side disc disposed coaxially with said input side disc and supported for rotation relative to said input side disc, a plurality of trunnions rockable about respective pivot axes transverse to a center axis of said discs, a plurality of power rollers each rotatably supported on a corresponding displacement shaft supported by a corresponding one of said trunnions, and held between the input side and output side discs, and a respective thrust anti-friction bearing provided between an outer side of each power roller and an inner side the corresponding trunnion, inner sides of the input side and output side discs which are opposed to each other being made into concave surfaces of an arcuate cross-sectional shape, a peripheral surface of each power roller being made into a spherical convex surface, each said peripheral surface and said inner sides being made to bear against each other, characterized in that at least one of the following conditions (a) to (e) is satisfied:

(a) a hardened layer by heat treatment is formed on a surface of each power roller, and on a connecting portion between an inner periphery and an inner side of each power roller, a chamfered portion of which a dimension in an axial direction of the power roller is 15% or less of the total axial dimension of the power roller is formed after said hardened layer has been formed, and of said hardened layer, an abnormally heat-treated layer is removed by forming the chamfered portion;

(b) a hardened layer by heat treatment is formed on a surface of each power roller, and on the connecting portion between the inner periphery and the inner side of each power roller, shot peening is done after said hardened layer has been formed, and residual compressive stress due to said shot peening exists in the connecting portion;

(c) said peripheral surface of each power roller is made into a smooth surface of which the roughness is 0.05 Ra or less by super-finish;

(d) an inner race track of said thrust anti-friction bearing formed on the outer side of each power roller and an outer race track formed on an inner side of an outer race provided near the inner side of each trunnion are made into smooth surfaces of which the roughness is 0.05 Ra or less; and (e) the outer race of said thrust anti-friction bearing is provided near the inner side of each trunnion, a hardened layer of which the hardness is Hv 550 or greater is formed on said peripheral surface of each power roller and the inner race track portion on the outer side of each power roller with a thickness of 2–4 mm, and a hardened layer of which the hardness is Hv 550 or greater is formed on the outer race track portion formed on the inner side of said outer race with a thickness of 0.7–1.5 mm.

4. A toroidal continuously variable transmission according to claim 3, characterized in that a plurality of said conditions (a) to (e) are satisfied.

5. A toroidal continuously variable transmission comprising an input shaft, an input side disc rotatable with the input shaft, an output side disc disposed coaxially with the input side disc and supported for rotation relative to the input side disc, a plurality of trunnions rockable about respective pivot axes transverse to a center axis of the input side and output side discs, a plurality of power rollers each rotatable supported on a corresponding displacement shaft supported by a corresponding one of said trunnions, and held between the input side and output side discs, and a respective thrust anti-friction bearing provided between an outer side of each power roller and an inner side of the corresponding trunnion and permitting rotation of that power roller while supporting a thrust load applied to that power roller, inner sides of the input side and output side discs which are opposed to each other being made into concave surfaces of an arcuate cross-sectional shape, a peripheral surface of each power roller being made into a spherical convex surface, each said peripheral surface and said inner sides being made to bear against each other, characterized in that each said thrust anti-friction bearing has an annular outer race rotatably supported on an intermediate portion of the corresponding displacement shaft by a rolling bearing.

6. A toroidal continuously variable transmission according to claim 5, characterized in that said rolling bearing is a needle bearing.

7. A torodial continuously variable transmission comprising a rotatable input side disc, a rotatable output side disc, and a power roller having a peripheral surface engaged with said input side and output side discs to transmit rotation from said input side disc to said output side disc, said power roller being rotatably mounted on a displacement shaft supported by a trunnion that is rockable to change an orientation of said power roller relative to said input side and output side discs, and a thrust anti-friction bearing provided between an outer side of said power roller and an inner side of said trunnion and permitting rotation of said power roller while supporting a thrust load, said thrust anti-friction bearing including an outer race rotatably supported on an intermediate portion of said displacement shaft by a bearing member disposed between said outer race and said intermediate portion of said displacement shaft.

8. A toroidal continuously variable transmission according to claim 7, characterized in that the said outer race is rotatably supported on said intermediate portion of said displacement shaft by a bushing.

9. A torodial continuously variable transmission, comprising a rotatable input side disc, a rotatable output side disc, and a power roller having a peripheral surface engaged with said input side and output side discs to transmit rotation from said input side disc to said output side disc, said power roller being rotatably mounted on a displacement shaft supported by a trunnion that is rockable to change an orientation of said power roller relative to said input side and output side discs, characterized in that at least one of the following conditions (a) to (e) is satisfied:

(a) a hardened layer by heat treatment is formed on a surface of said power roller, and on a connecting portion between an inner periphery and an inner side of said power roller, a chamfered portion of which a dimension in an axial direction of the power roller is 15% or less of the total axial dimension of the power roller is formed after said hardened layer has been formed, and of said hardened layer, an abnormally heat-treated layer is removed by forming the chamfered portion;

(b) a hardened layer by heat treatment is formed on a surface of said power roller, and on the connecting portion between the inner periphery and the inner side of said power roller, shot peening is done after said hardened layer has been formed, and residual compressive stress due to said shot peening exists in the connecting portion;

(c) said peripheral surface of the power roller is made into a smooth surface of which the roughness is 0.05 Ra or less by super-finish;

(d) an inner race track of said thrust anti-friction bearing formed on the outer side of said power roller and an outer race track formed on an inner side of an outer race provided near the inner side of said trunnion are made into smooth surfaces of which the roughness is 0.05 Ra or less; and (e) the outer race of said thrust anti-friction bearing is provided near the inner side of said trunnion, a hardened layer of which the hardness is Hv 550 or greater is formed on said peripheral surface of said power roller and the inner race track portion on the outer side of said power roller with a thickness of 2–4 mm, and a hardened layer of which the hardness is Hv 550 or greater is formed on the outer race track portion formed on the inner side of said outer race with a thickness of 0.7–1.5 mm.

10. A toroidal continuously variable transmission according to claim 9, characterized in that a plurality of said conditions (a) to (e) are satisfied.

11. A toroidal continuously variable transmission comprising a rotatable input side disc, a rotatable output side disc, and a power roller having a peripheral surface engaged with said input side and output side discs to transmit rotation from said input side disc to said output side disc, said power roller being rotatably mounted on a displacement shaft supported by a trunnion that is rockable to change an orientation of said power roller relative to said input side and output side discs, and a thrust anti-friction bearing provided between an outer side of said power roller and an inner side of said trunnion and permitting rotation of said power roller while supporting a thrust load, said thrust anti-friction bearing including an outer race rotatably supported on an intermediate portion of said displacement shaft by a rolling bearing.

12. A toroidal continuously variable transmission according to claim 11, characterized in that said rolling bearing is a needle bearing.

* * * * *